United States Patent
Awasthi et al.

(10) Patent No.: US 10,502,133 B2
(45) Date of Patent: Dec. 10, 2019

(54) FASTENER COVER FOR FLOWPATH FASTENERS

(71) Applicant: General Electric Company, Schenectady, NY (US)

(72) Inventors: Richa Awasthi, Bangalore (IN); Bhanu Kishore Battu, Bangalore (IN); Viswanadha Gupta Sakala, Bangalore (IN); Michael Jason Bishop, Mason, OH (US)

(73) Assignee: General Electric Company, Schenectady, NY (US)

( * ) Notice: Subject to any disclaimer, the term of this patent is extended or adjusted under 35 U.S.C. 154(b) by 261 days.

(21) Appl. No.: 15/620,451

(22) Filed: Jun. 12, 2017

(65) Prior Publication Data

US 2018/0355796 A1 Dec. 13, 2018

(51) Int. Cl.
| | | |
|---|---|---|
| F02C 7/04 | (2006.01) | |
| F01D 5/30 | (2006.01) | |
| F02C 7/00 | (2006.01) | |
| F16B 35/06 | (2006.01) | |
| F16B 37/14 | (2006.01) | |

(52) U.S. Cl.
CPC .............. *F02C 7/04* (2013.01); *F01D 5/3007* (2013.01); *F02C 7/00* (2013.01); *F05D 2220/32* (2013.01); *F05D 2250/10* (2013.01); *F05D 2260/31* (2013.01); *F16B 35/06* (2013.01); *F16B 37/14* (2013.01)

(58) Field of Classification Search
CPC .. F02C 7/04; F02C 7/00; F01D 5/3007; F16B 35/06; F16B 37/14; F05D 2260/31; F05D 2250/10; F05D 2220/32

USPC ....................................................... 415/245 R
See application file for complete search history.

(56) References Cited

U.S. PATENT DOCUMENTS

| | | | | | |
|---|---|---|---|---|---|
| 1,400,535 | A | * | 12/1921 | Flannery | F22B 7/16 411/374 |
| 1,401,684 | A | * | 12/1921 | Flannery | F22B 7/16 29/422 |
| 2,968,375 | A | * | 1/1961 | Avery, Sr. | B23Q 1/26 403/2 |
| 3,551,922 | A | * | 1/1971 | Watson | A47K 13/26 4/236 |
| 3,618,992 | A | | 11/1971 | Whistler, Sr. et al. | |
| 3,703,341 | A | * | 11/1972 | Garofalo | A63H 27/02 416/245 R |
| 3,799,693 | A | * | 3/1974 | Hull | F02C 7/04 415/218.1 |
| 4,863,354 | A | * | 9/1989 | Asselin | B64C 11/14 416/245 R |
| 5,257,905 | A | * | 11/1993 | Wynn | F01D 5/026 415/122.1 |
| 5,573,378 | A | * | 11/1996 | Barcza | B64C 11/14 411/175 |

(Continued)

*Primary Examiner* — J. Todd Newton
(74) *Attorney, Agent, or Firm* — General Electric; Pamela Kachur

(57) ABSTRACT

A fastener cover assembly is disclosed. The cover assembly includes a turbomachinery component having an outer surface exposed to an air flow path; at least one recess formed in the outer surface; a fastener contained in the at least one recess; and a fastener cover secured in the at least one recess, the cover having an outer surface substantially flush with the outer surface of the component to minimize air flow disruption.

18 Claims, 16 Drawing Sheets

(56) References Cited

U.S. PATENT DOCUMENTS

| | | | | |
|---|---|---|---|---|
| 5,788,442 A * | 8/1998 | Eder | | F16B 37/14 |
| | | | | 411/372 |
| 6,045,310 A | 4/2000 | Miller et al. | | |
| 6,053,681 A * | 4/2000 | Mattershead | | F16B 37/14 |
| | | | | 411/14 |
| 6,447,255 B1 * | 9/2002 | Bagnall | | F01D 5/066 |
| | | | | 277/626 |
| 6,512,781 B1 | 2/2003 | Meyer et al. | | |
| 6,520,742 B1 * | 2/2003 | Forrester | | F01D 5/06 |
| | | | | 416/220 R |
| 7,303,377 B2 * | 12/2007 | Rockarts | | F01D 5/027 |
| | | | | 416/144 |
| 7,946,013 B2 * | 5/2011 | Kumagai | | B25B 27/00 |
| | | | | 29/255 |
| 7,967,562 B2 | 6/2011 | Frost et al. | | |
| 8,215,910 B2 * | 7/2012 | Belmonte | | B64C 11/14 |
| | | | | 416/144 |
| 8,556,561 B2 | 10/2013 | Norton | | |
| 8,800,292 B2 * | 8/2014 | Bottcher | | F23M 5/04 |
| | | | | 60/752 |
| 8,870,508 B2 * | 10/2014 | Hsu | | F16B 37/14 |
| | | | | 411/372.5 |
| 8,985,952 B2 * | 3/2015 | Belmonte | | F01D 5/027 |
| | | | | 416/144 |
| 9,188,149 B2 * | 11/2015 | Bennett | | F16B 41/005 |
| 9,283,904 B2 * | 3/2016 | Parenti | | F16B 37/14 |
| 9,290,276 B2 * | 3/2016 | Watanabe | | B64D 45/02 |
| 9,540,939 B2 * | 1/2017 | Maliniak | | F02C 7/04 |
| 9,759,129 B2 * | 9/2017 | Lindsey | | F02C 7/04 |
| 10,155,411 B2 * | 12/2018 | Hoff | | B60B 7/16 |
| 10,227,772 B1 * | 3/2019 | Hill | | E04B 1/40 |
| 2002/0102160 A1 * | 8/2002 | Breakwell | | B64C 11/14 |
| | | | | 415/219.1 |
| 2004/0161339 A1 * | 8/2004 | Breakwell | | B64C 11/14 |
| | | | | 416/245 R |
| 2005/0095081 A1 * | 5/2005 | Tu | | F16B 37/14 |
| | | | | 411/372.6 |
| 2008/0286071 A1 * | 11/2008 | Potter | | F16B 1/0071 |
| | | | | 411/372.6 |
| 2009/0214354 A1 * | 8/2009 | Bagnall | | F01D 5/066 |
| | | | | 416/245 R |
| 2010/0051112 A1 * | 3/2010 | Dieling | | F02C 7/04 |
| | | | | 137/15.1 |
| 2010/0258199 A1 * | 10/2010 | Schreiber | | F02C 7/04 |
| | | | | 137/15.1 |
| 2010/0260605 A1 * | 10/2010 | MacFarlane | | F01D 5/027 |
| | | | | 416/144 |
| 2010/0322782 A1 * | 12/2010 | Welch | | F02C 7/04 |
| | | | | 416/244 R |
| 2012/0134843 A1 * | 5/2012 | Bottome | | F01D 5/066 |
| | | | | 416/245 R |
| 2012/0257958 A1 * | 10/2012 | Norton | | F01D 5/025 |
| | | | | 415/108 |
| 2013/0334389 A1 * | 12/2013 | Hill | | F16M 13/00 |
| | | | | 248/346.01 |
| 2013/0336743 A1 * | 12/2013 | Hill | | F16B 35/00 |
| | | | | 411/372.6 |
| 2014/0369787 A1 * | 12/2014 | Hill | | F16B 21/00 |
| | | | | 411/368 |
| 2015/0086295 A1 * | 3/2015 | Cameron | | F16B 37/14 |
| | | | | 411/429 |
| 2015/0308485 A1 * | 10/2015 | Gallant | | F16B 21/183 |
| | | | | 411/103 |
| 2015/0345315 A1 * | 12/2015 | Orieux | | F04D 29/542 |
| | | | | 415/211.2 |
| 2016/0069267 A1 * | 3/2016 | Philbrick | | F16B 39/021 |
| | | | | 416/204 A |
| 2017/0051617 A1 * | 2/2017 | Guilbert | | F01D 9/041 |
| 2017/0114800 A1 * | 4/2017 | Burkholder | | F04D 29/329 |
| 2017/0306776 A1 * | 10/2017 | Simonds | | F01D 25/243 |
| 2018/0187711 A1 * | 7/2018 | Rao | | F16B 39/12 |
| 2018/0245513 A1 * | 8/2018 | Servant | | F02C 7/04 |
| 2018/0355796 A1 * | 12/2018 | Awasthi | | F01D 5/3007 |

* cited by examiner

FASTENER COVER FOR FLOWPATH FASTENERS

BACKGROUND OF THE INVENTION

This invention relates generally to improving specific fuel consumption (SFC) of turbomachinery, and more specifically to a cover for fasteners exposed to a fluid flow.

A gas turbine engine includes a turbomachinery core having a high-pressure compressor, combustor, and high-pressure turbine in serial flow relationship. The core is operable in a known manner to generate a primary flow of propulsive gas. A typical turbofan engine adds a low-pressure turbine driven by the core exhaust gases which in turn drives a fan rotor through a shaft to generate a bypass flow of propulsive gas. In the case of a high bypass engine this provides the majority of the total engine thrust.

The fan rotor includes an array of fan blades extending radially outward from a fan disk. A spinner is connected to an aft support ring, which is connected to the fan disk, using mechanical fasteners. The spinner is used to reduce aerodynamic drag and to smooth air flow so that air enters the engine inlet more efficiently, amongst other functions. The spinner includes an array of clearance slots positioned about a periphery of the spinner to allow the mechanical fasteners to reside below an outer peripheral surface of the spinner. The spinner also includes an array of trim pockets positioned about the periphery to permit trim bolts to be placed therein. The trim bolts are used to provide a final correction or offset of an imbalance.

Together, the mechanical fasteners, trim bolts, clearance slots, and trim pockets create a three-dimensional (3D) feature that resides in the aero flow path. This 3D feature affects the laminar flow of the inlet air which in turn affects the performance. Thus, there is a need for a cover that reduces the size of the 3D feature, helps smooth the air flow, reduces local flow losses, and improves the specific fuel consumption (SFC) of the turbomachinery.

BRIEF DESCRIPTION OF THE INVENTION

This need is addressed by the technology described herein, which provides a fastener cover for fasteners exposed to a fluid flow.

According to one aspect of the technology described herein, a fastener cover assembly includes a turbomachinery component having an outer surface exposed to an air flow path; at least one recess formed in the outer surface; a fastener contained in the at least one recess; and a fastener cover secured in the at least one recess, the cover having an outer surface substantially flush with the outer surface of the component to minimize air flow disruption.

According to another aspect of the technology described herein, a spinner assembly for a gas turbine engine includes a spinner having an outer surface exposed to an air flow path, the spinner including at least one recess formed in the outer surface for receiving and containing a fastener therein at a position below the outer surface; a fastener secured in the at least one recess; and a fastener cover secured in the at least one recess, the cover having an outer surface substantially flush with the outer surface of the spinner to minimize air flow disruption.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
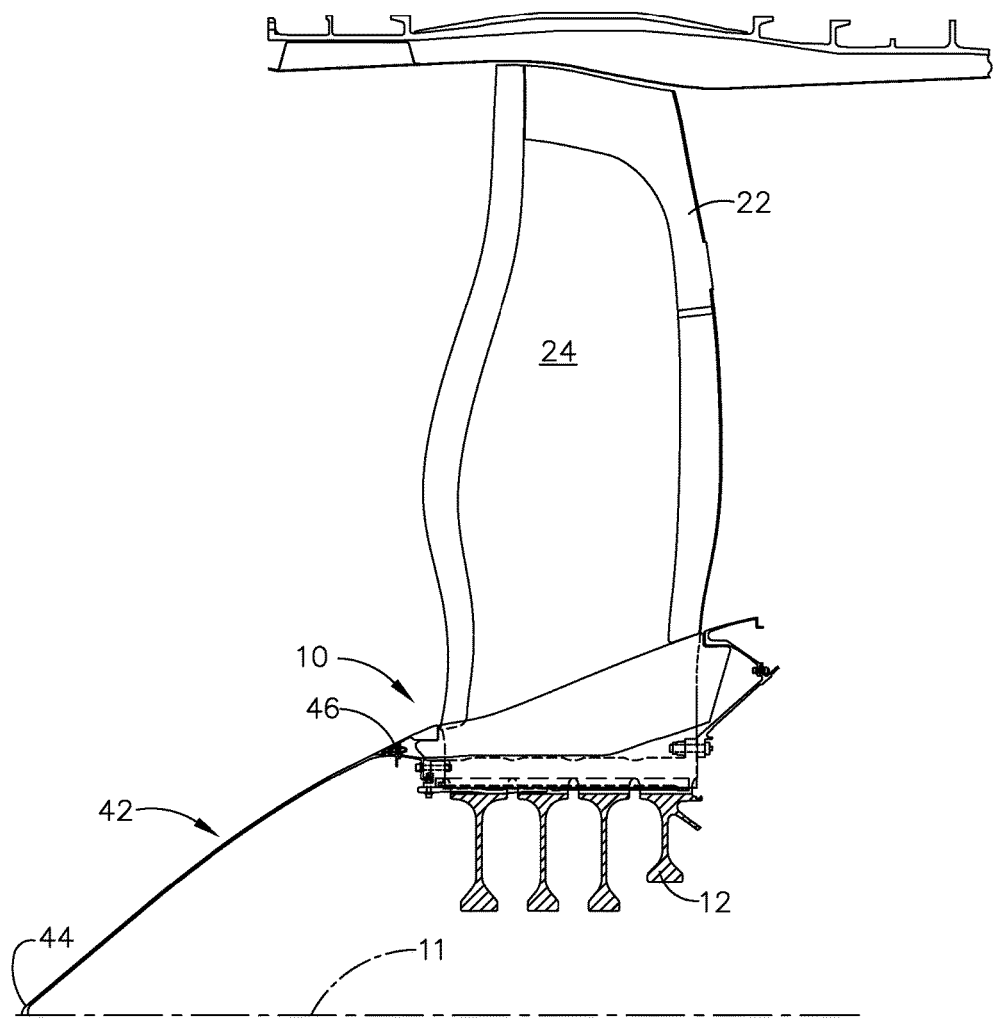
FIG. 1 is a partially-sectioned side elevation view of a fan rotor of a gas turbine engine.
Figure 2:
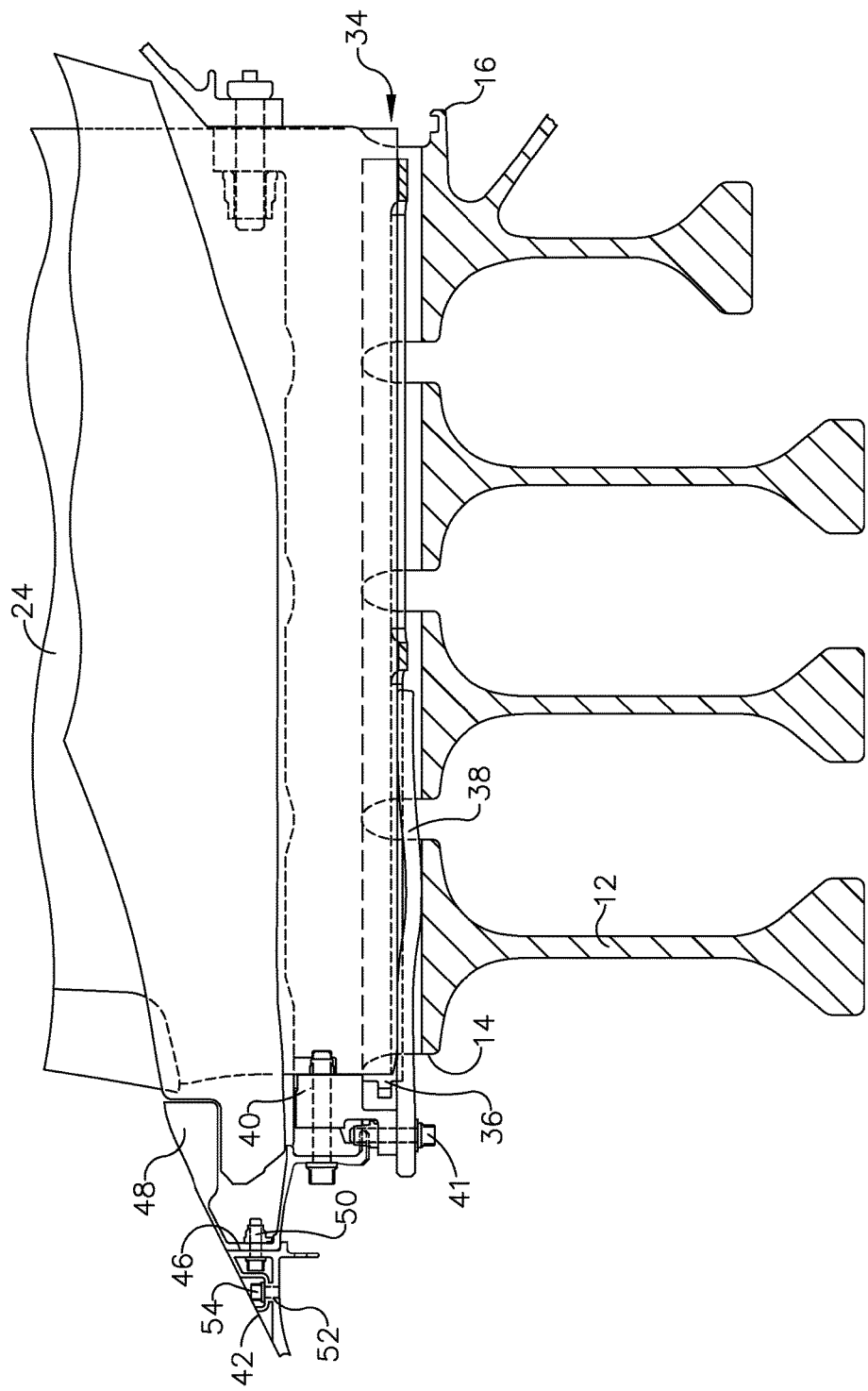
FIG. 2 is an enlarged view of a portion of the fan rotor shown in FIG. 1.
Figure 3:
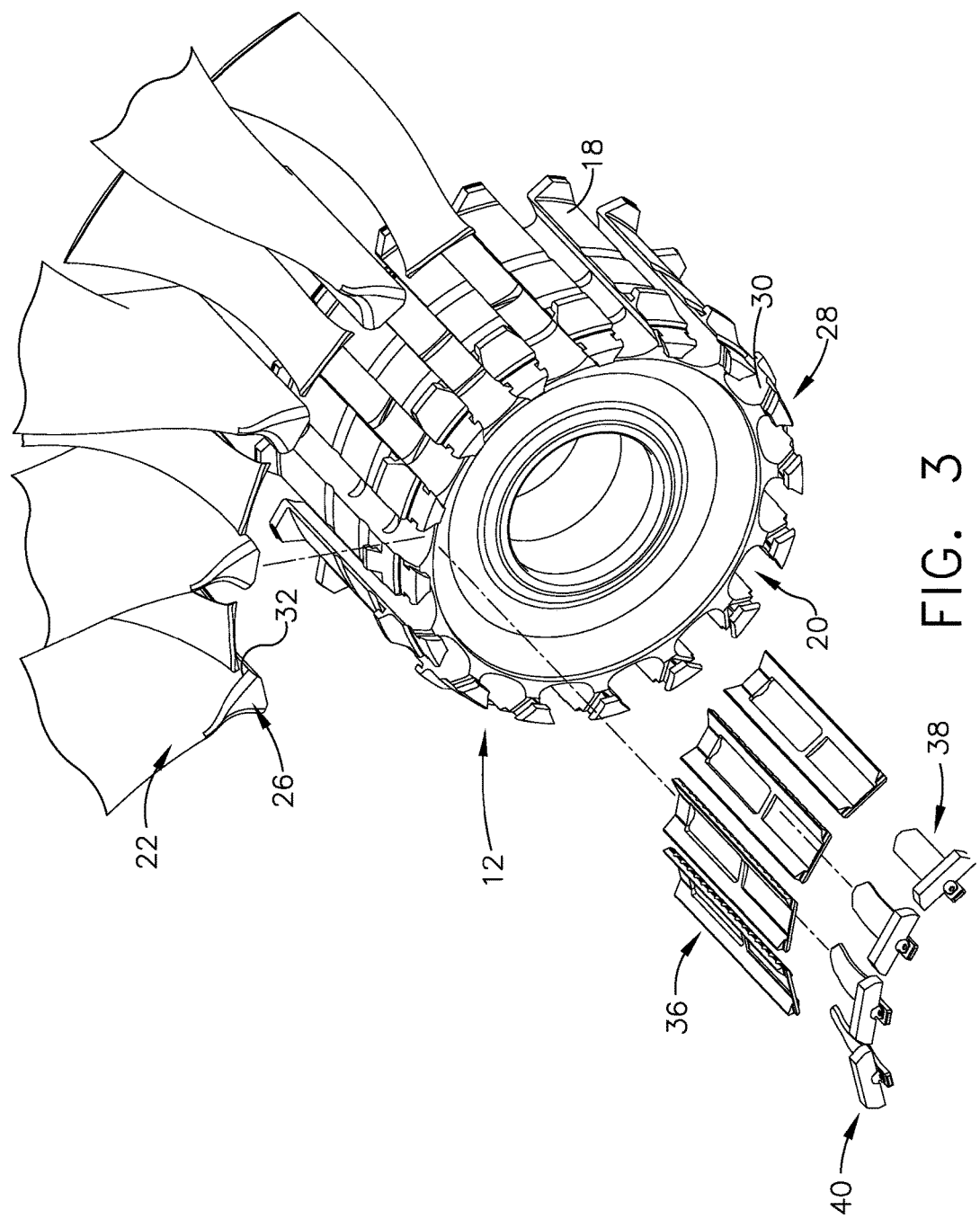
FIG. 3 is an exploded perspective view of the fan rotor shown in FIG. 1.

Referring to the drawings wherein identical reference numerals denote the same elements throughout the various views, FIGS. 1-3 depict a fan rotor 10 which forms a part of a high-bypass gas turbine engine. It will be understood that the principles described herein are equally applicable to other types of turbine engines, as well as to other types of rotating or stationary mechanical elements.

The fan rotor 10 comprises a fan disk 12 including a forward end 14 and an aft end 16. The fan disk 12 is mounted for rotation about an axis 11 and is coupled to a driving shaft in accordance with conventional practice (not shown). As seen in FIG. 3, the fan disk 12 includes an annular array of dovetail posts 18 alternating with dovetail slots 20. An array of fan blades 22 are mounted to the fan disk 12. Each fan blade 22 includes an airfoil 24 with an axial dovetail 26 at its root. For purposes of describing the present invention, the fan rotor 10 is generically representative of any turbomachinery rotor having a disk carrying an array of blades.

Each dovetail post 18 includes a finger 28 extending axially forward (see FIG. 3). Each dovetail slot 20 includes a pair of converging faces 30 that mate with a corresponding pair of pressure faces 32 of the respective dovetail 26. When a fan blade 22 is mounted in a dovetail slot 20, there is a radial gap 34 present between the base of the dovetail 26 and a radially-inner boundary of the dovetail slot 20.

As seen in FIGS. 2 and 3, a dovetail key 36 is inserted into the dovetail slots 20 to fill the radial gap 34 and thereby to prevent the fan blade 22 from moving radially during low RPM engine operation, when centrifugal load is not capable of overcoming gravitational loads on the fan blade 22.

A spring 38 is disposed in the dovetail slot 20. The spring 38 is a leaf-type spring with a shallow "U" shape and is configured to apply radially outward pressure against the fan blade 22.

A retainer 40 is disposed adjacent the forward end 14 of the fan disk 12 between adjacent fingers 28. The spring 38 and the retainer 40 are clamped to each other using a mechanical fastener, for example the illustrated bolt 41. Thus assembled, the fan blade 22, the retainer 40, the dovetail key 36, and the spring 38 form a closed mechanical loop which retains the fan blade 22 in the dovetail slot 20.

A spinner 42 (FIGS. 1 and 2) is provided which functions as an aerodynamic fairing for the fan rotor 10. The spinner 42 is a body of revolution and is generally hollow with a nose 44 disposed on the axis 11 and a mounting flange 46 that abuts an aft support ring 48 which is mounted to the fan disk 12. In the illustrated example the cross-sectional shape of the spinner 42 is roughly conical, but other shapes are also used. The spinner 42 is attached to the aft support ring 48, for example using the illustrated aft support ring bolts 50 or other suitable mechanical fasteners.

In operation, the spinner 42 is exposed to an air flow path. As used herein the term "flow path" refers generally to any open or closed boundary through which air or another fluid flows. For example, it can refer to a "primary flowpath" of a turbine engine (often referred to simply as the "flowpath") as well as an internal "secondary flowpath" of a turbine engine. The principles described herein are applicable to any component similarly exposed to a fluid (e.g. gas or air) flow.

Figure 4:
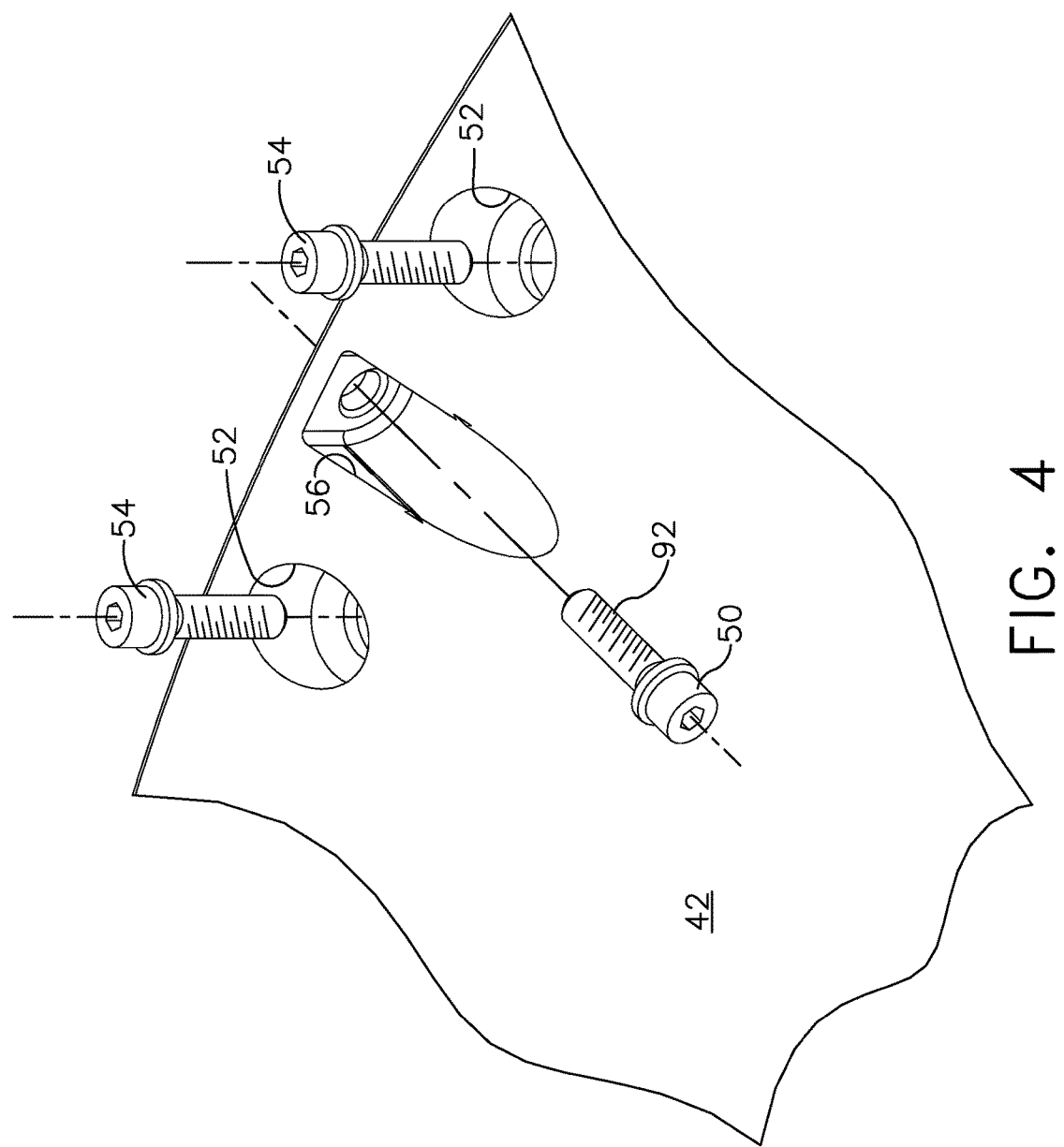
FIG. 4 is a partial perspective view of a spinner, having an array of trim bolt pockets and clearance slots, for use with the fan rotor of FIG. 1.

As illustrated in FIG. 4, the spinner 42 includes both an array of bolt clearance slots 56 and trim bolt pockets 52 for receiving aft support ring bolts 50 and trim bolts 54, respectively. For purposes of this description, the bolt clearance slots 56 and trim bolt pockets 52 are examples of a "recess". As discussed above, the aft support ring bolts 50 attach the spinner 42 to the aft support ring 48. The trim bolts 54 allow for a final correction or offset of imbalance by placing trim bolts 54 of varying weights in all of the trim bolt pockets 52 to complete the final balance of the fan rotor 10.

The bolt clearance slots 56 and trim bolt pockets 52 permit the bolts 50 and 54 to be positioned below an outer peripheral surface of the spinner 42 such that a head of the bolts 50 and 54 does not protrude above the outer peripheral surface of the spinner 42; however, such slots, pockets, and bolts create a three-dimensional (3D) feature located in the aero flow path which affects the laminar flow of inlet air, thereby affecting performance.

Figure 5:
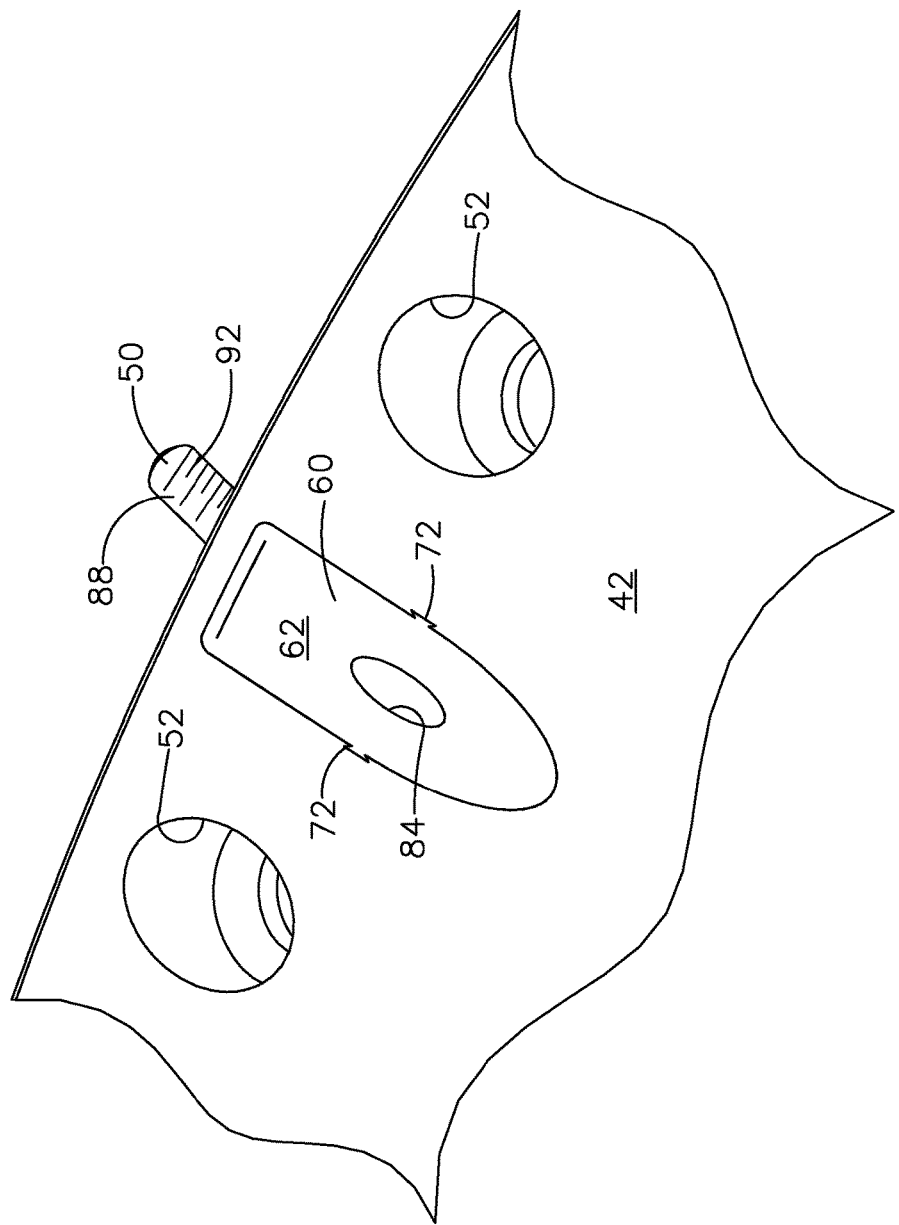
FIG. 5 is a partial perspective view of the spinner of FIG. 4 with a clearance slot cover installed.
Figure 6:
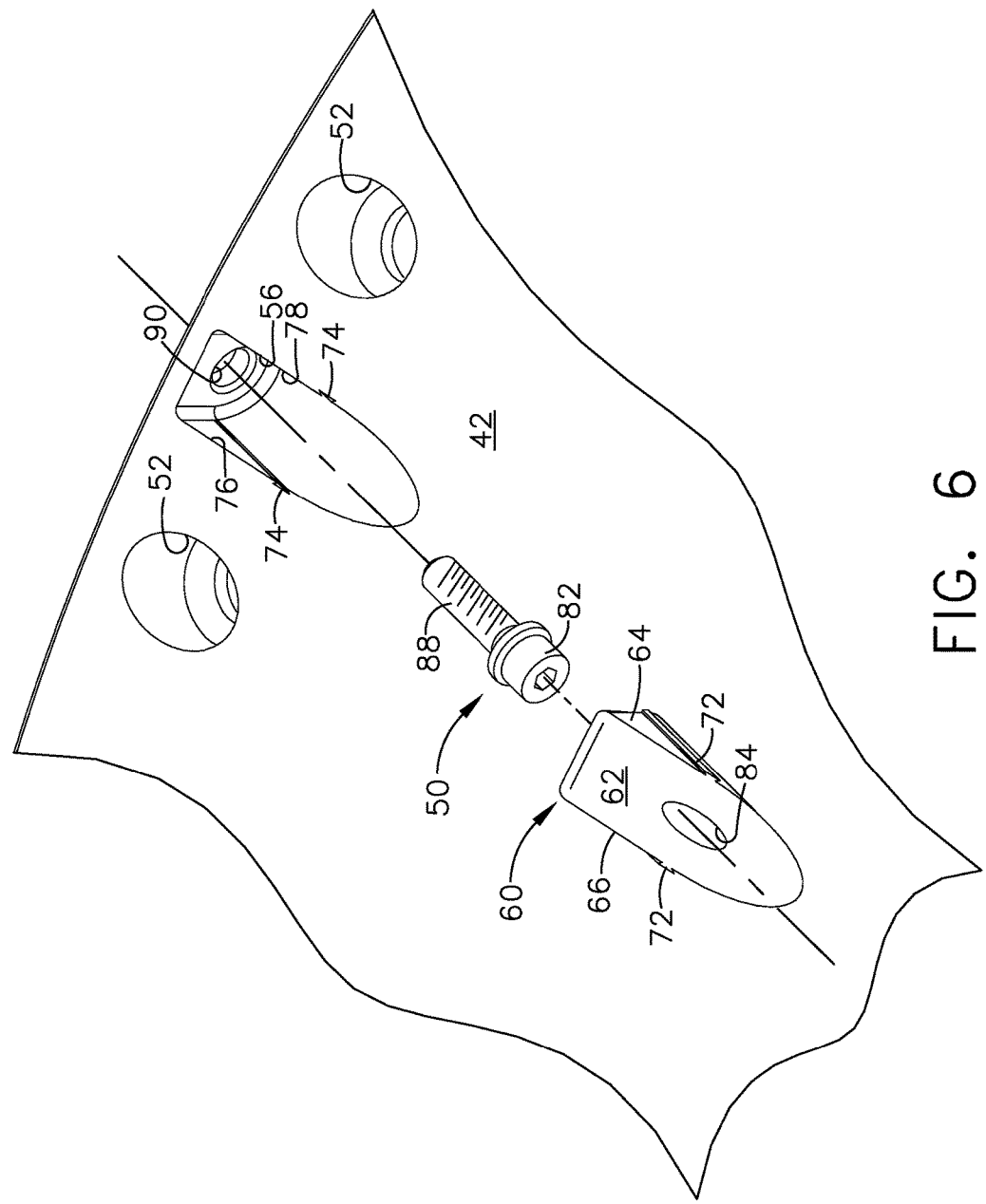
FIG. 6 is an exploded view of the clearance slot cover of FIG. 5 being installed.
Figure 7:
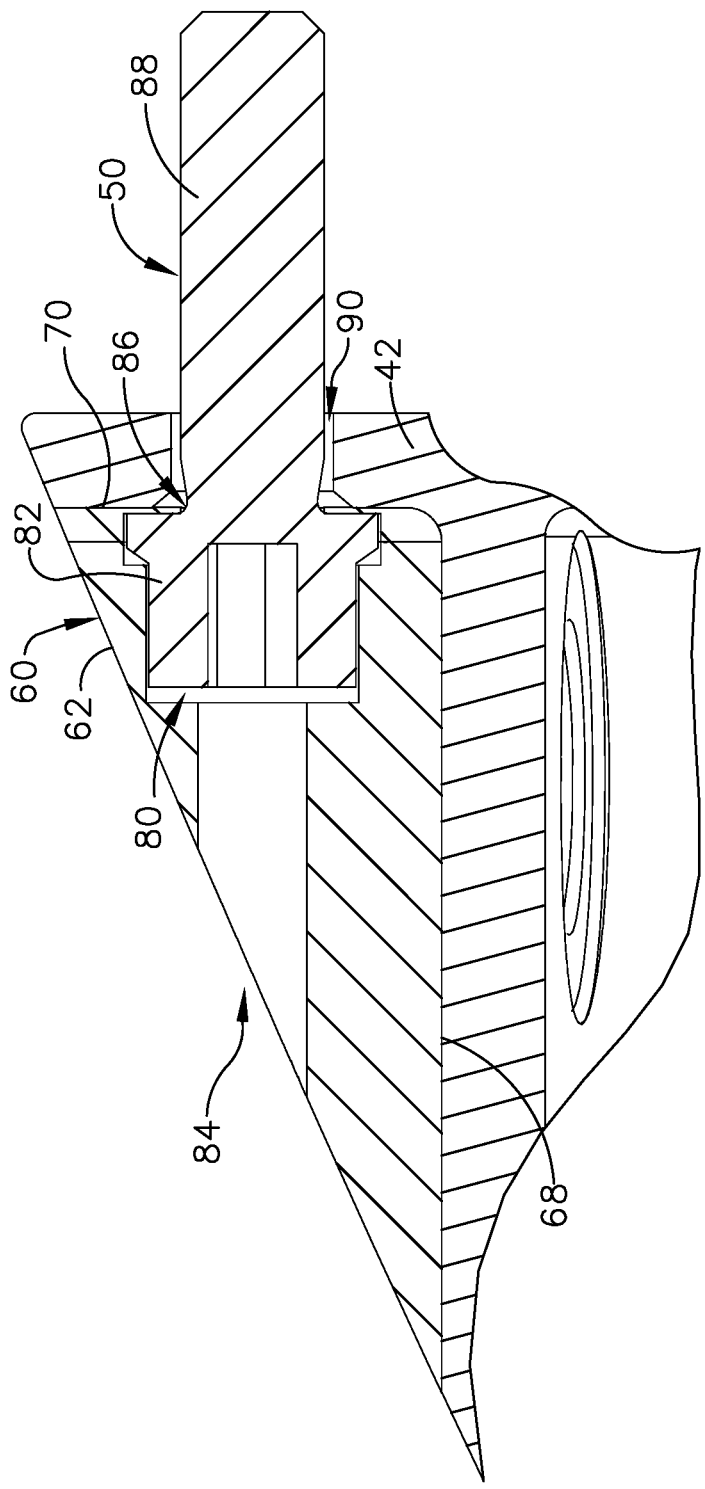
FIG. 7 is a side cross-sectional view of the clearance slot cover of FIG. 5 installed in the clearance slot of the spinner.

A clearance slot cover 60 is shown in FIGS. 5-7. The clearance slot cover 60 is made of a light weight material selected based on the environment that the bolts 50 are exposed to. For the purposes of this description, the clearance slot cover 60 is an example of a "fastener cover". The clearance slot cover 60 includes a top surface 62, first and second opposing sides 64, 66, a bottom 68, and an end wall 70. The top surface 62 has a profile configured to match a profile of the spinner 42 to minimize aero flow path disruption. For example, the top surface 62 may be substantially flush with an outer surface of the spinner 42, that is, flush or slightly protruding or recessed. The first and second sides 64, 66, bottom 68, and end wall 70 cooperate to form a profile complimentary to a profile of the clearance slot 56 to allow the clearance slot cover 60 to be in mating engagement with the clearance slot 56.

The first and second sides 64, 66 each include an elongated projection 72 extending along their length. The elongated projections 72 are positioned along the first and second sides 64, 66 for mating engagement with slots 74 cut and/or formed into opposing sides 76, 78 of the clearance slot 56. As illustrated, the projections 72 and slots 74 create a dovetail-type joint having a pair of spaced-apart oppositely-inclined faces to securely hold the clearance slot cover 60 in position within the clearance slot 56. It should be appreciated that the projections 72 and slots 74 may be reversed such that the sides 64, 66 include the slots and the sides 76, 78 include the projections. It should also be appreciated that other suitable types of joints may be used to securely hold the clearance slot cover 60 in position.

As illustrated in FIG. 7, a cavity 80 is formed between the top surface 62 and the end wall 70 to receive a head 82 of bolt 50 therein. The cavity 80 is in fluid communication with aperture 84 extending through the clearance slot cover 60 between the top surface 62 and cavity 80 and aperture 86 positioned in the end wall 70. Aperture 84 permits a tool to be inserted therein to access the head 82 of the bolt 50 while aperture 86 permits a shank 88 of the bolt 50 to extend therethrough. When the clearance slot cover 60 is installed in the clearance slot 56, the aperture 84, cavity 80, and aperture 86 are in axial alignment with aperture 90 of the spinner 42.

Figure 8:
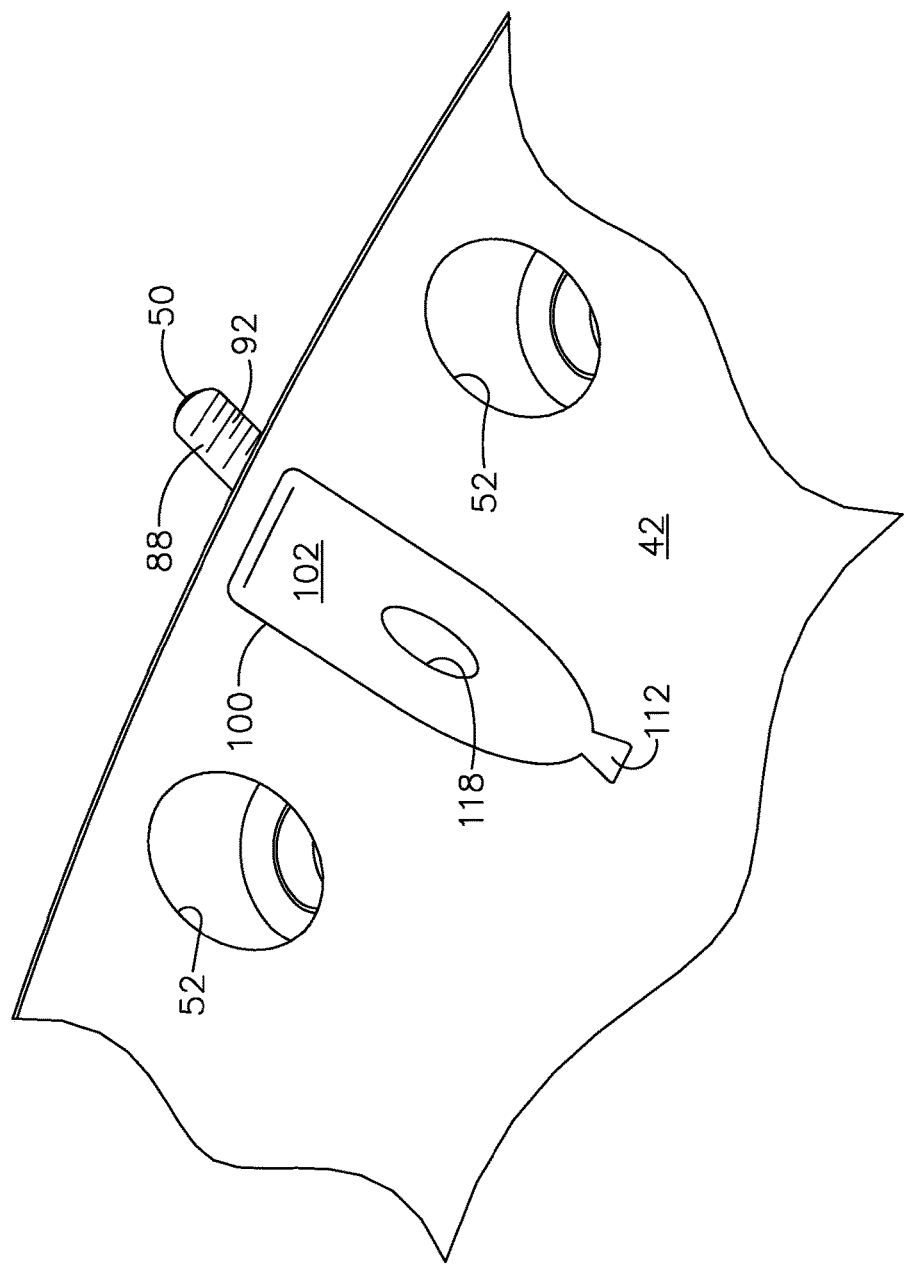
FIG. 8 is a partial perspective view of the spinner of FIG. 4 with a clearance slot cover installed.
Figure 9:
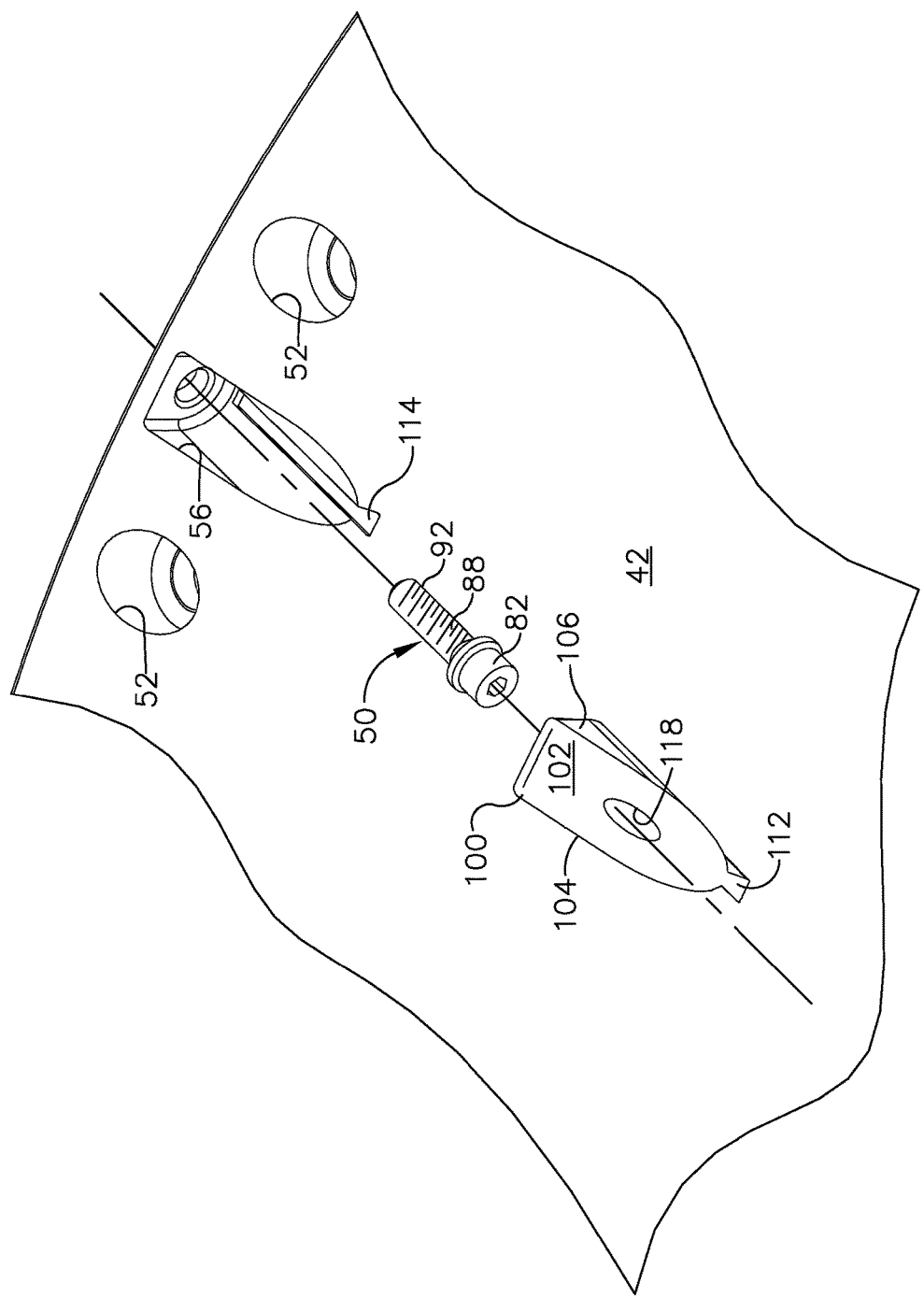
FIG. 9 is an exploded view of the clearance slot cover of FIG. 8 being installed.
Figure 10:
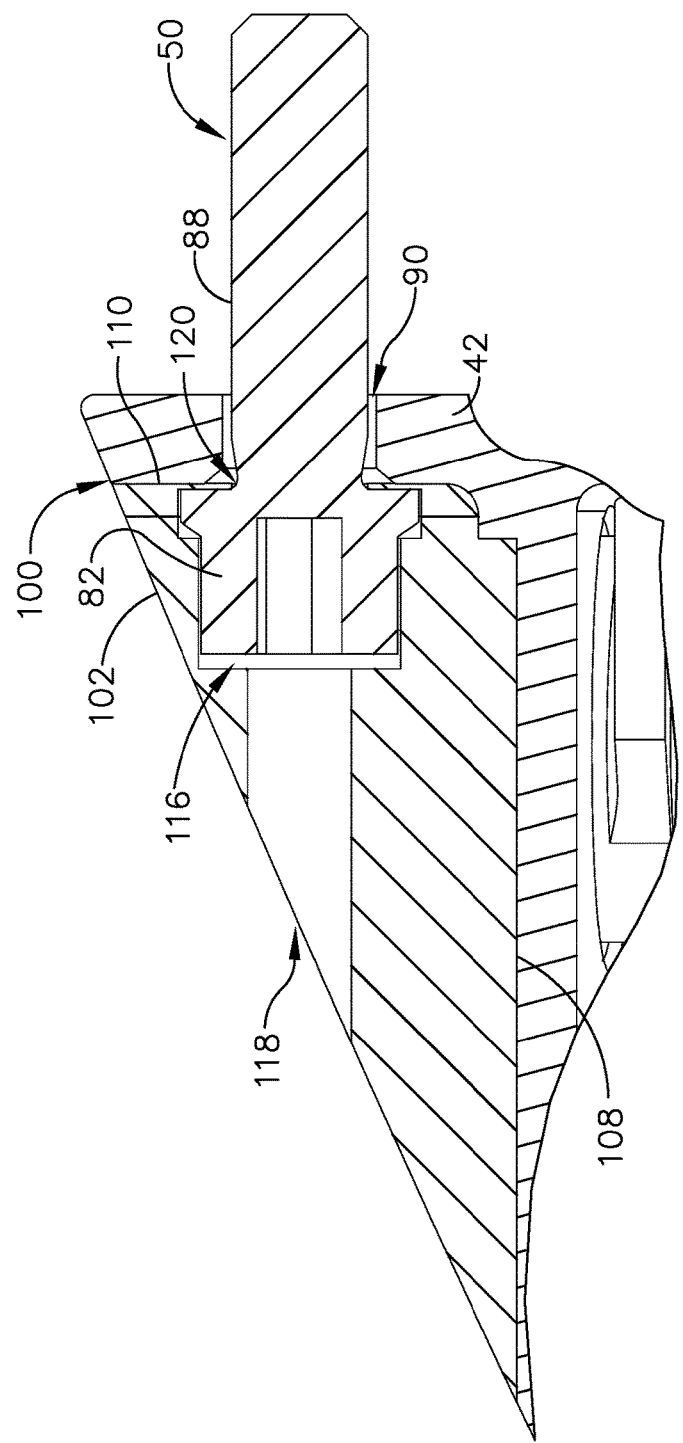
FIG. 10 is a side cross-sectional view of the clearance slot cover of FIG. 8 installed in the clearance slot of the spinner.

As illustrated in FIGS. 8-10, an alternative clearance slot cover 100 may also be used to cover clearance slot 56. Like clearance slot cover 60, clearance slot cover 100 includes a top surface 102, first and second opposing sides 104, 106, a bottom 108, and an end wall 110. The top surface 102 has a profile to match a profile of the spinner 42 to minimize aero flow path disruption, and may be substantially flush as described above. The first and second sides 104, 106, bottom 108, and end wall 110 cooperate to form a profile complimentary to a profile of the clearance slot 56 to allow the clearance slot cover 100 to be in mating engagement with the clearance slot 56.

An elongated projection 112 extends along a length of the bottom 108. The projection 112 is positioned along the bottom 108 for mating engagement with a slot 114 cut and/or formed into a bottom of the clearance slot 56. As illustrated, the projection 112 and slot 114 create a dovetail-type joint to securely hold the clearance slot cover 100 in position within the clearance slot 56. It should be appreciated that the projection 112 and slot 114 may be reversed such that the bottom 108 includes the slot and the bottom 114 includes the projection. It should also be appreciated that other suitable types of joints may be used to securely hold the clearance slot cover 100 in position.

Like clearance slot cover 60, clearance slot cover 100 also includes a cavity 116 formed between the top surface 102 and the end wall 110 to receive a head 82 of bolt 50 therein. The cavity 116 is in fluid communication with aperture 118 extending through the clearance slot cover 100 between the top surface 102 and cavity 116 and aperture 120 positioned in the end wall 110. Use of the clearance slot cover 100 is substantially the same as clearance slot cover 60. When the clearance slot cover 100 is installed in the clearance slot 56, the aperture 118, cavity 116, and aperture 120 are in axial alignment with aperture 90 of the spinner 42.

Figure 11:
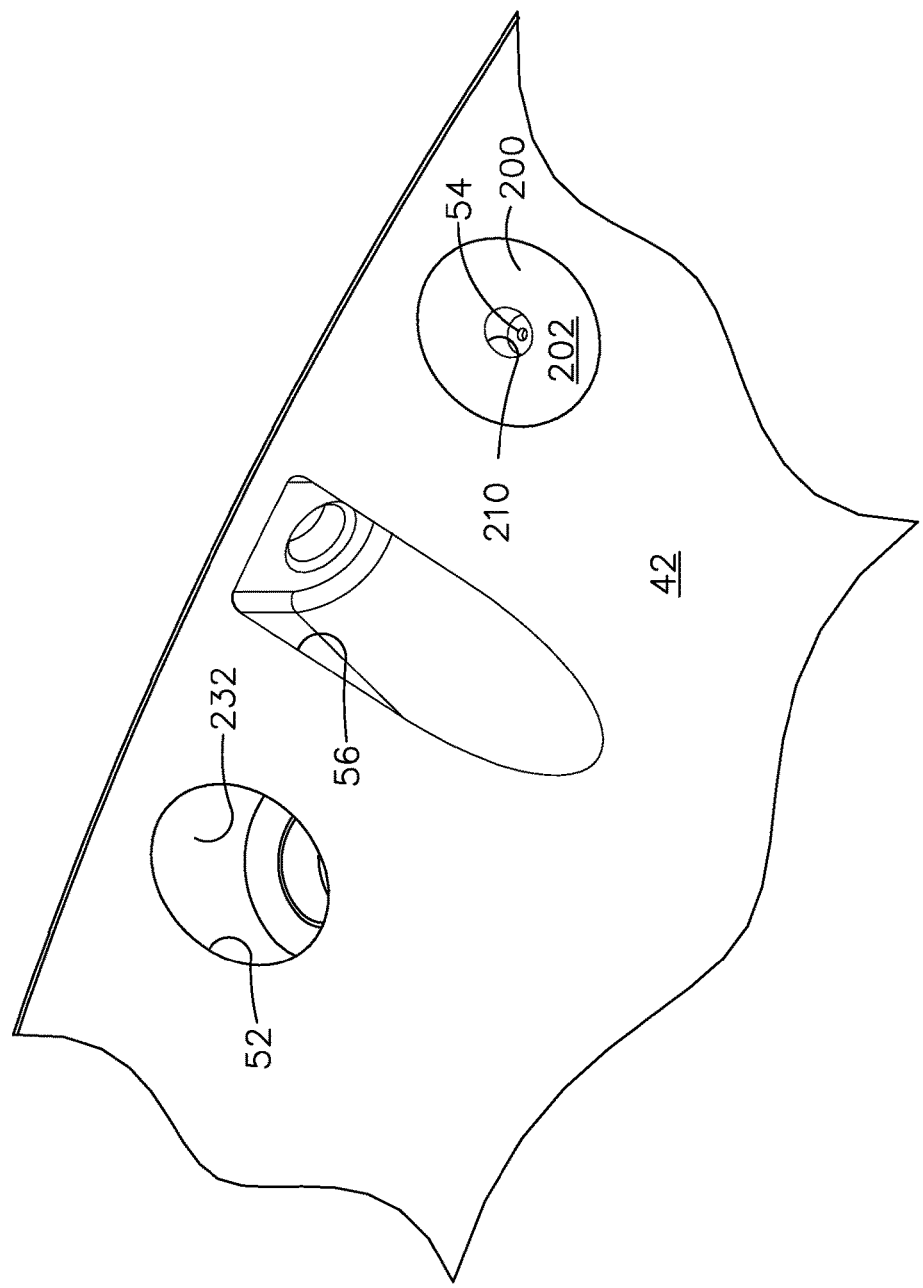
FIG. 11 is a partial perspective view of the spinner of FIG. 4 with a trim bolt pocket cover installed.
Figure 12:
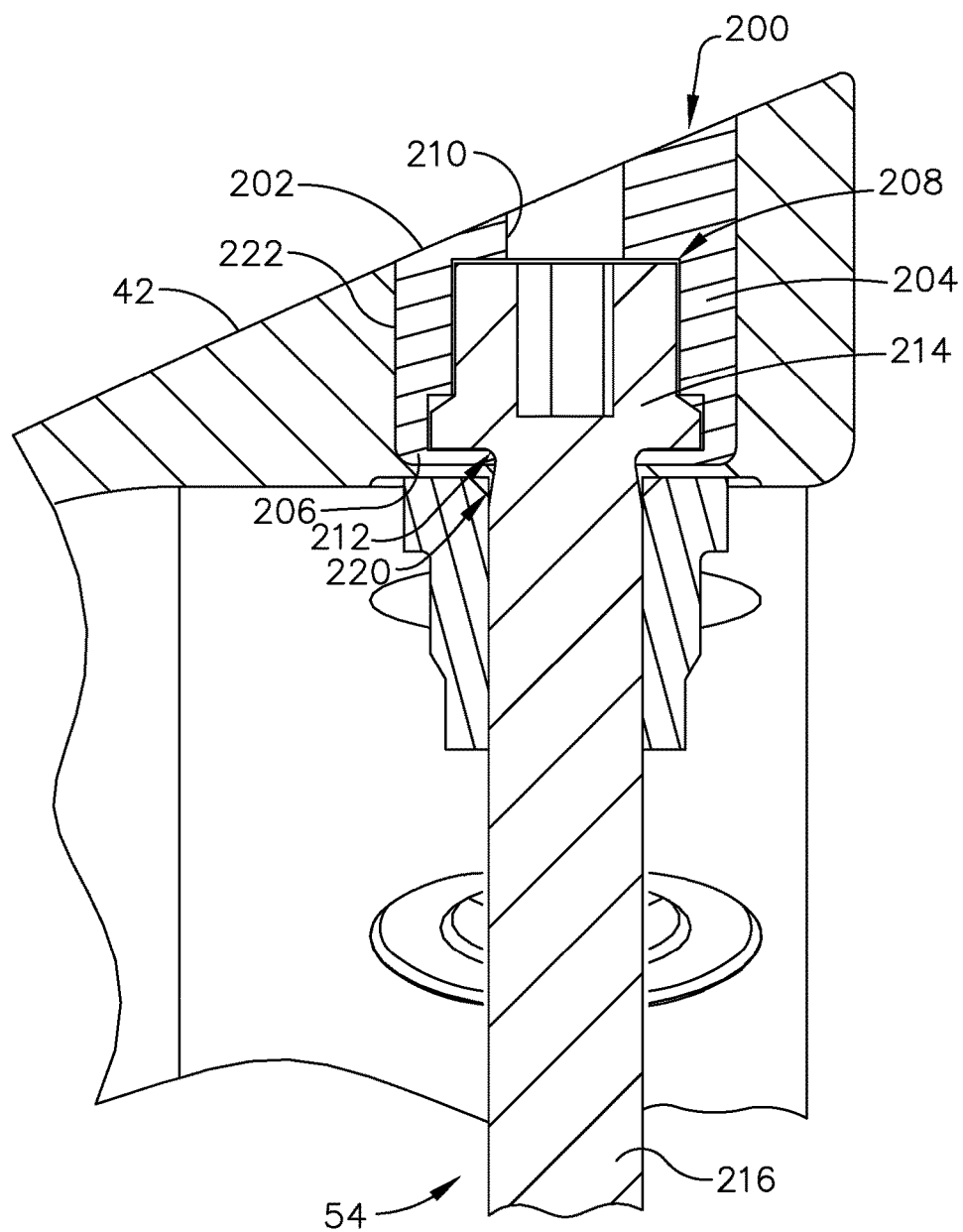
FIG. 12 is a side cross-sectional view of the trim bolt pocket cover of FIG. 11 installed in the trim bolt pocket of the spinner.

A trim bolt pocket cover 200 is illustrated in FIGS. 11 and 12. Like clearance slot covers 60 and 100, trim bolt pocket cover 200 includes a top surface 202, an end wall 206, cavity 208, aperture 210 extending through the top surface 202 and in fluid communication with the cavity 208, and aperture 212 extending through end wall 206 and in fluid communication with cavity 208. Trim pocket cover 200 has a continuous sidewall 204 to match a profile of trim bolt pocket 52 and engage sidewall 222 of the trim bolt pocket; however, it should be appreciated that trim bolt pocket cover 200 may have multiple sidewalls to match a trim bolt pocket 52 having a different profile. For the purposes of this description, the trim bolt pocket cover 200 is another example of a "fastener cover".

As discussed above with clearance slot covers 60 and 100, cavity 208 is configured to receive a head 214 of trim bolt 54 therein and shank 216 of trim bolt 54 extends through aperture 212 into aperture 220 of the spinner 42. The top surface 202 has a profile to match a profile of spinner 42 to minimize aero flow disruption, and may be substantially flush as described above. As illustrated, trim pocket cover 200 does not include a keyed joint (dovetail joint or other type of joint) like clearance slot covers 60 and 100; however, it should be appreciated that such keyed joints may be used.

For purposes of clarity, a description of using the clearance slot covers 60 and 100 as well as trim pocket cover 200 will be limited to a discussion of clearance slot cover 60. Where the use of clearance slot cover 100 or trim pocket cover differs from clearance slot cover 60, such difference will be discussed.

Figure 16:
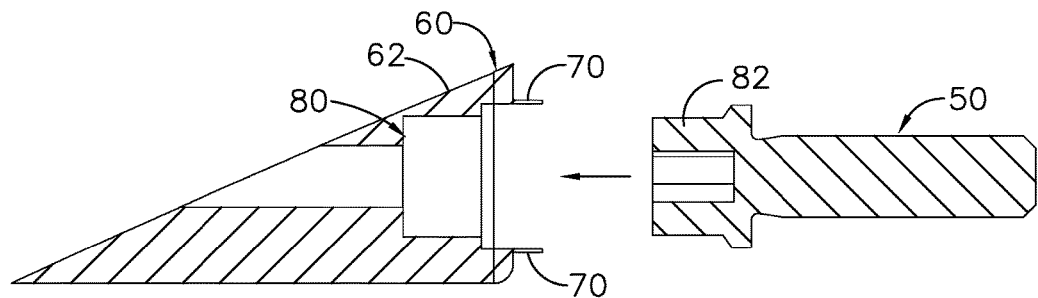
FIG. 16 is a schematic exploded cross-sectional view showing a first step of an assembly of a bolt to a clearance slot cover.
Figure 17:
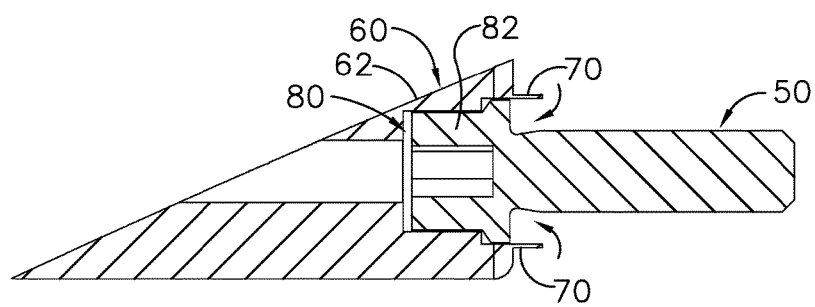
FIG. 17 is a schematic cross-sectional view showing a second step of an assembly of a bolt to a clearance slot cover.
Figure 18:
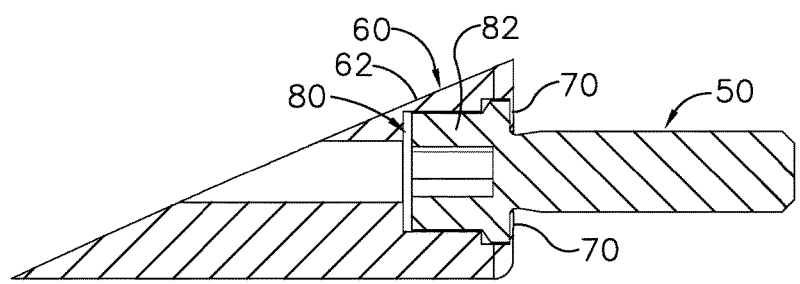
FIG. 18 is a schematic cross-sectional view showing a bolt assembled to a clearance slot cover.

In use, the head 82 of bolt 50 is inserted into cavity 80. This may be done, for example using a swaging process as illustrated in FIGS. 16-18. Initially, end wall 70 is bent outward to enlarge aperture 86 or is manufactured with portions of the end wall 70 already extending outward as shown in FIG. 16. The head 82 is then inserted into the cavity 80 as shown in FIG. 17. The next step is crimping and/or swaging the end wall 70 around the shank 88 to secure the head 82 in the cavity 80, as shown by the arrows in FIG. 17. The final assembled bolt 50 and clearance slot cover 60 are shown in FIG. 18. Swaging may be facilitated by incorporating an end wall of ductile material such as a metal alloy. Alternatively, the clearance slot cover 60 could be formed (e.g. molded) around the head 82 so that the head 82 is "captured". In the secured position, the end wall 70 forms a lip that resides against the head 82 to prevent the bolt 50 from being pulled out of the cavity 80. With the head 82 secured in the cavity 80, the clearance slot cover 60 and bolt 50 are slid into the clearance slot 56 by aligning the shank 88 with aperture 90 and projections 72 with slots 74 until the shank 88 makes contact with an aperture of the aft support ring 48.

A tool is inserted into the aperture 84 and used to turn the bolt 50 so that threads 92 on the shank 88 engage the aperture of the aft support ring 48, thereby causing the bolt 50 and clearance slot cover 60 to move into the clearance slot 56 until the head 82 of the bolt 50 compresses the end wall 70 against the spinner 42 and the spinner 42 against the aft support ring 48. As the bolt 50 is turned, the projections 72 slide into mating engagement with the slots 74. In the case of clearance slot cover 100, projection 112 slides into slot 114 until wall 110 is compressed against the spinner 42 by head 82.

The mating engagement of the projections 72 and slots 74 prevent the clearance slot cover 60 from moving radially out of the clearance slot 56 while the bolt 50 prevents the clearance slot cover 60 from moving axially out of the clearance slot 56, thereby securing the clearance slot cover 60 in the clearance slot 56 and reducing a size of the 3D feature. For clearance slot cover 100, projections 112 and slot 114 prevent the clearance slot cover 100 from moving radially out of the clearance slot 56. For trim bolt pocket cover 200, movement in the axial direction is prevented by mating engagement between the continuous sidewall 204 with sidewall 222 of the trim bolt pocket while bolt 54 prevents radial movement of the trim bolt pocket cover 200.

Figure 13:
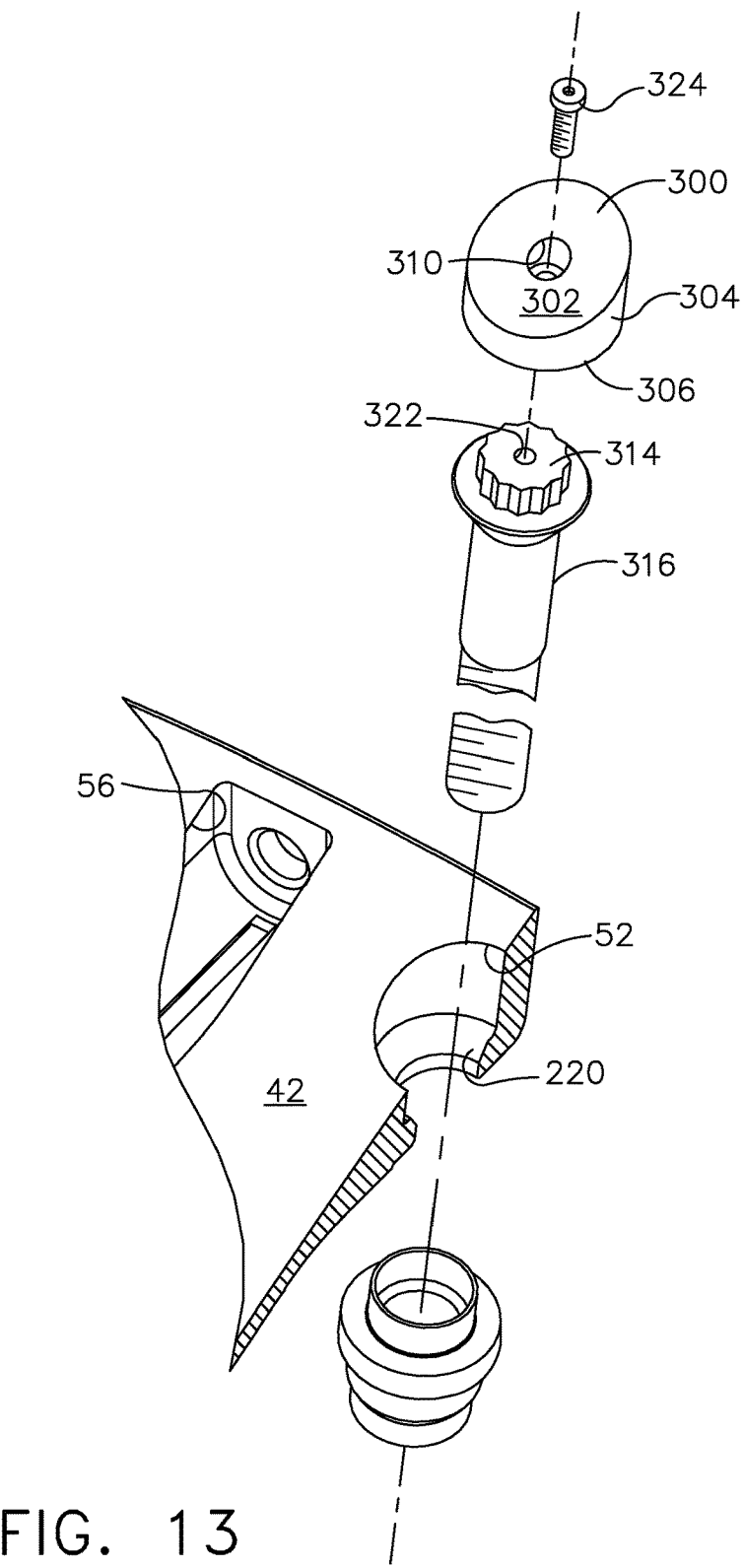
FIG. 13 is an exploded view of a trim bolt pocket cover being installed in a trim bolt pocket of the spinner of FIG. 4.
Figure 14:
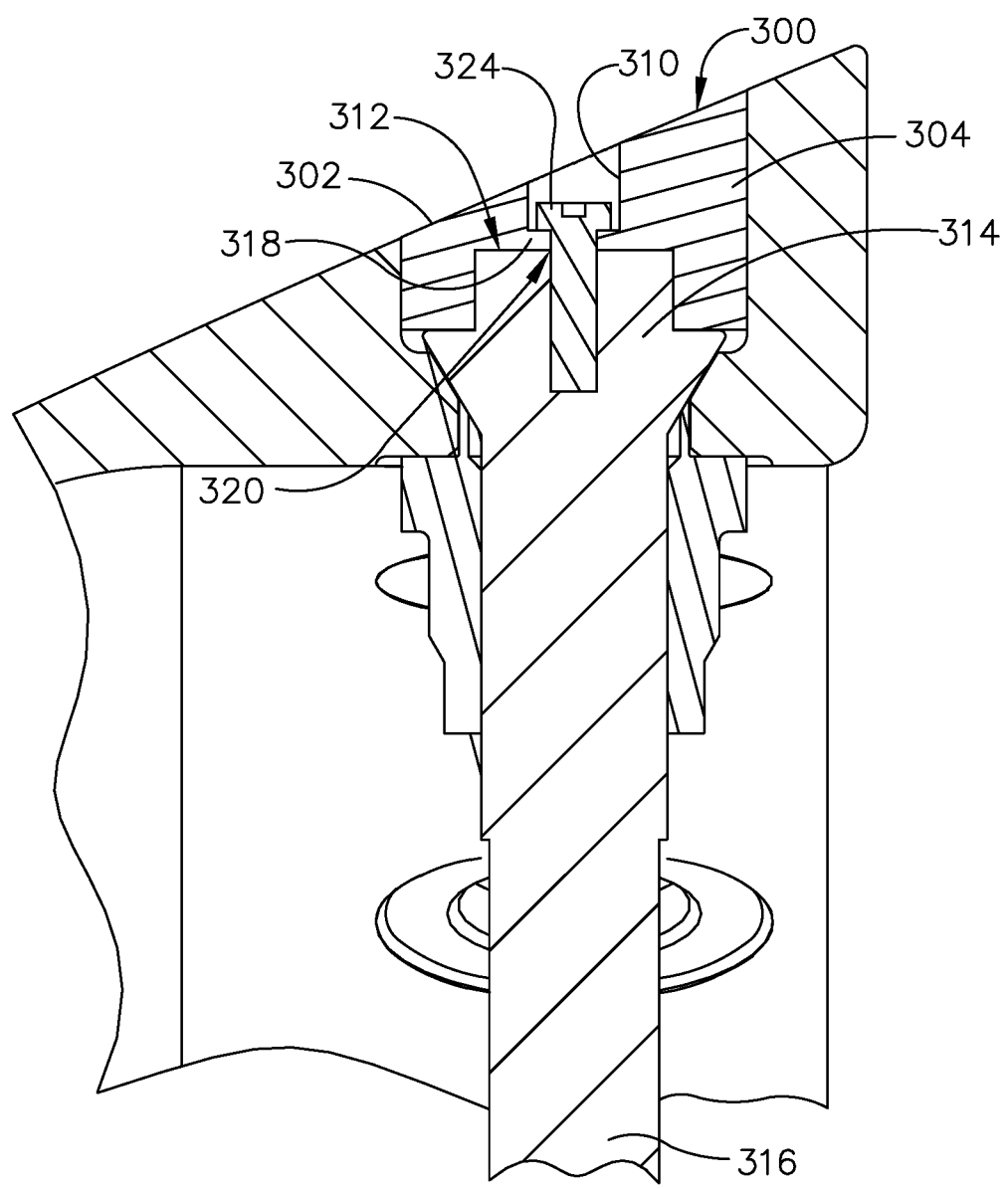
FIG. 14 is a side cross-sectional view of the trim bolt pocket cover of FIG. 13 installed in the trim bolt pocket of the spinner.
Figure 15:
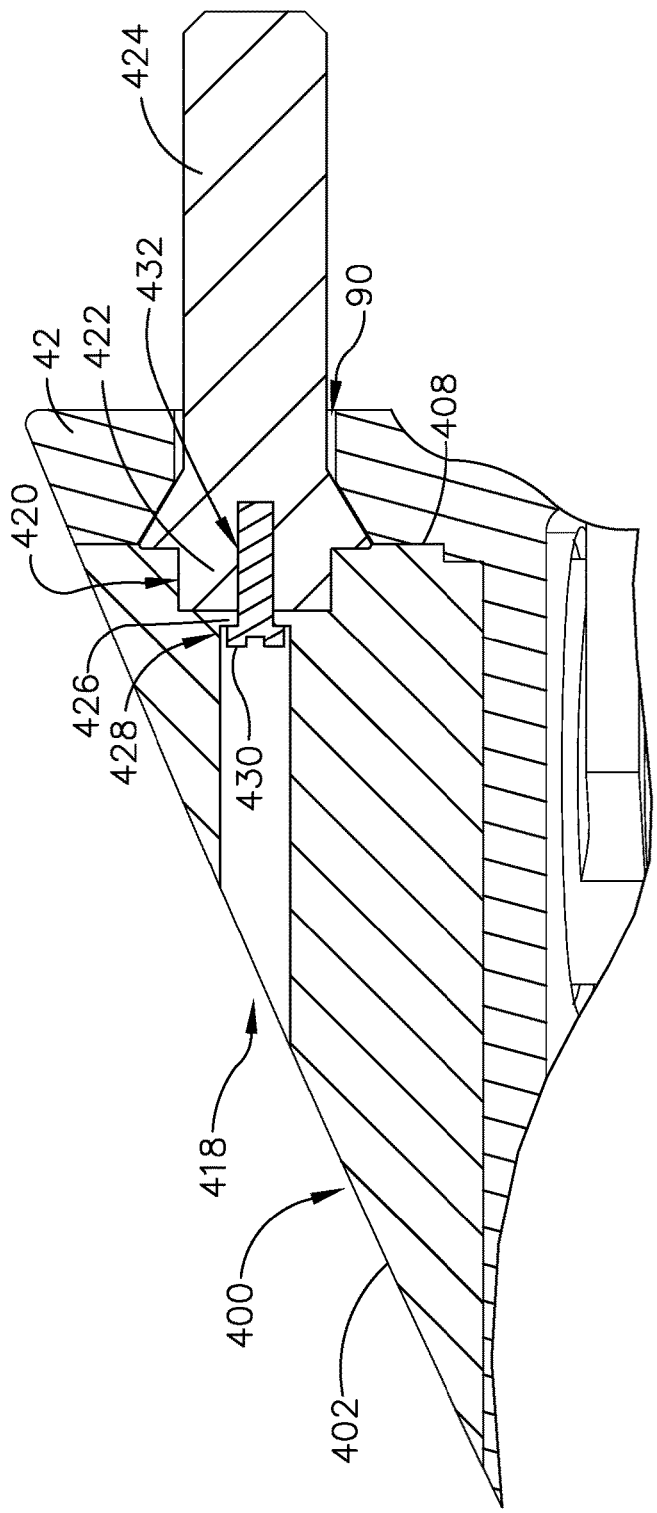
FIG. 15 is a side cross-sectional view of a clearance slot cover installed in the clearance slot of the spinner of FIG. 4

Alternatively, FIGS. 13-15, both the trim bolt pocket cover and clearance slot cover ("fastener covers") may be formed with a recess in the end instead of cavity to allow the cover to be positioned in the slot or pocket after fasteners have been used to balance and secure the spinner 42 to the aft support ring 48.

As illustrated in FIGS. 13-14, like trim bolt pocket cover 200, trim bolt pocket cover 300 includes a top surface 302, a continuous sidewall 304, an end wall 306, and an aperture 310. A recess 312 is formed in the end wall 306 to receive a head 314 of bolt 316 therein. The aperture 310 is in fluid communication with the recess 312 and includes divider wall 318 having an aperture 320 extending therethrough. The head 314 of the bolt 316 includes a threaded aperture 322 extending therein for receiving a fastener 324 such as a screw therein. Apertures 320 and 322 are axially aligned to permit the fastener 324 to extend through the aperture 320 into aperture 322 to permit the fastener 324 to secure the trim bolt pocket cover 300 in position within trim bolt pocket 52. As shown, fastener 324 compresses the divider wall 318 against head 314. When secured, the top surface 302 may be substantially flush as described above.

FIG. 15 shows a clearance slot cover 400 like that of clearance slot covers 60 and 100. Clearance slot cover 400 has the many of the same structures as clearance slot covers 60 and 100, for example, a top surface 402, an end wall 408, and an aperture 418. Clearance slot cover 400 differs from clearance slot covers 60 and 100 in that it has a recess 420 formed in the end wall 408 to receive a head 422 of a bolt 424 therein. Aperture 418 is in fluid communication with recess 420 and includes a divider wall 426 having an aperture 428 extending therethrough to receive a fastener 430 such as a screw.

The head 422 of bolt 424 includes a threaded aperture 432 extending therein for receiving the fastener 430. Apertures 428 and 432 are axially aligned to permit the fastener 430 to extend through aperture 428 and into aperture 432 to permit the fastener 430 to secure the clearance slot cover 400 in position within the clearance slot 56. As shown, fastener 430 compresses the divider wall 426 against head 422 to secure the clearance slot cover 400 in position. When secured, the top surface 402 may be substantially flush as described above.

In use, trim bolt pocket cover 300 and clearance slot cover 400 are used in the same manner. As a result, only the trim bolt pocket cover 300 will be discussed, except where differences arise.

Bolt 316 is installed in the trim bolt pocket 52 by inserting the bolt 316 through aperture 220 of the spinner 42 and is secured therein by tightening the bolt 316 down until the head 314 compresses against the spinner 42. Once bolt 316 has been tightened, trim bolt pocket cover 300 is inserted into trim bolt pocket 52 such that the top surface 302 matches the outer peripheral surface of the spinner 42 and the recess 312 slides over the head 314 of the bolt 316. The trim bolt pocket cover 300 is pushed into the trim bolt pocket 52 until the top surface 302 is smooth or substantially flush with the outer peripheral surface of the spinner 42.

Once the trim bolt pocket cover 300 is in position, fastener 324 is inserted into aperture 310 and then through aperture 320 until the fastener 324 engages aperture 322. A tool is inserted into aperture 310 to access the fastener 324 and is used to secure the fastener 324 to bolt 316. For example, fastener 324 may be a threaded fastener that is rotated by the tool until the fastener 324 compresses the divider wall 318 against the head 314 of the bolt 316.

The fastener covers described herein have several advantages over prior art. For example, the fastener covers reduce aerodynamic drag caused by 3D features created by the recesses and bolts, thereby improving specific fuel consumption. Additionally, the fastener covers may be used with existing spinner and/or turbomachinery component designs with little to no modifications of the turbomachinery components.

The foregoing has described a fastener cover. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A fastener cover assembly, comprising: a turbomachinery component having an outer surface exposed to an air flow path; at least one recess formed in the outer surface; a fastener contained in the at least one recess, wherein a head of the fastener is at a position below the outer surface of turbomachinery component; and
    a fastener cover secured in the at least one recess, the cover having an outer surface substantially flush with the outer surface of the turbomachinery component to minimize air flow disruption, wherein at least a portion of the fastener cover resides between the head of the fastener and the outer surface of the turbomachinery component.

2. The assembly according to claim 1, wherein the fastener cover includes a cavity configured to receive a head of the fastener therein.

3. The assembly according to claim 2, wherein the fastener cover includes an aperture extending through the fastener cover from the outer surface of the fastener cover to the cavity to allow a tool to be inserted therein and access the head of the fastener.

4. The assembly according to claim 2, wherein the fastener cover includes an end wall having an opening therein for receiving a shank of the fastener therethrough, the end wall forming a lip residing against the head to secure the head of the fastener in the cavity.

5. The assembly according to claim 1, wherein the fastener cover includes a recess formed in an end wall of the fastener cover, the recess configured to slip over a head of the fastener.

6. The assembly according to claim 5, wherein the head of the fastener includes a threaded aperture.

7. The assembly according to claim 6, wherein the fastener cover includes an aperture extending through the fastener cover from the outer surface of the fastener cover to a divider wall separating the aperture and recess, the divider wall having an aperture extending therethrough to provide access to the threaded aperture.

8. The assembly according to claim 7, further including a second fastener extending through the aperture in the dividing wall and into the threaded aperture, the second fastener securing the fastener cover to the fastener.

9. A spinner assembly for a gas turbine engine, comprising:
    a spinner having an outer surface exposed to an air flow path, the spinner including at least one recess formed in the outer surface;
    a fastener secured in the at least one recess, wherein a head of the fastener is at a position below the outer surface of the spinner; and
    a fastener cover secured in the at least one recess, the cover having an outer surface substantially flush with the outer surface of the spinner to minimize air flow disruption and includes:
        an end wall;
        a cavity configured to secure the head of the fastener therein;
        an aperture extending through the fastener cover from the outer surface of the fastener cover to the cavity, wherein the cavity is positioned between the aperture and the end wall; and
        wherein the end wall includes an opening configured to receive a shank of the fastener therethrough when the head is secured in the cavity.

10. The assembly according to claim 9, wherein the at least one recess is defined by at least one side, and wherein one of the at least one side and fastener cover includes a slot and the other of the at least one side and fastener cover includes a projection configured for mating engagement with the slot.

11. The assembly according to claim 10, wherein the slot and projection create a dovetail joint having a pair of spaced-apart oppositely-inclined faces.

12. The assembly according to claim 9, wherein the at least one recess is defined by at least one side, and wherein the at least one side includes a slot and the fastener cover includes a projection, the slot and projection being configured for mating engagement when the fastener cover is positioned in the at least one recess to prevent dislodgement of the fastener cover from the at least one recess.

13. The assembly according to claim 9, wherein the aperture is sized to permit access to the head of the fastener by a tool.

14. The assembly according to claim 9, wherein the end wall forms a lip residing against the head to secure the head of the fastener in the cavity.

15. The assembly according to claim 9, wherein the at least one recess includes a bottom, and wherein the bottom includes a slot and the fastener cover includes a projection positioned on a bottom of the fastener cover, the slot and projection being configured for mating engagement when the fastener cover is positioned in the at least one recess to prevent dislodgement of the fastener cover from the at least one recess.

16. The assembly according to claim 9, wherein the at least one recess is defined by first and second opposing sides, wherein a first slot is located on the first side of the at least one recess and a second slot is located on the second side of the at least one recess.

17. The assembly according to claim 16, wherein the fastener cover includes a first projection located on a first side of the fastener cover and a second projection located on a second side of the fastener cover, wherein the first projection is configured for mating engagement with the first slot and the second projection is configured for mating engagement with the second slot when the fastener cover is positioned in the at least one recess to prevent dislodgment of the fastener cover from the at least one recess.

18. A spinner assembly for a gas turbine engine, comprising:
 a spinner having an outer surface exposed to an air flow path, the spinner including at least one recess formed in the outer surface;
 a fastener secured in the at least one recess, wherein a head of the fastener is at a position below the outer surface of the spinner; and
 a fastener cover secured in the at least one recess, the cover having an outer surface substantially flush with the outer surface of the spinner to minimize air flow disruption and includes:
  an end wall having a recess formed therein, the recess configured to slip over the head of the fastener;
  an aperture extending through the fastener cover from the outer surface to a divider wall separating the aperture and the recess, the divider wall having an aperture extending therethrough; and
  a second fastener extending through the aperture in the divider wall and into a threaded aperture in the head of the fastener to secure the fastener cover to the fastener.

* * * * *